(12) United States Patent
Hebrank et al.

(10) Patent No.: US 7,438,968 B2
(45) Date of Patent: Oct. 21, 2008

(54) ROADWAY AND VEHICULAR-MOUNTED REFLECTORS INCORPORATING A FIELD OF DISCRETE CRYSTAL REFLECTORS AND RETROREFLECTORS

(75) Inventors: Jack Hebrank, Durham, NC (US); Charles Eric Hunter, Jefferson, NC (US); Michael A. Wiener, New York, NY (US); Drew G. Narayan, Durham, NC (US); Laurie E. McNeil, Chapel Hill, NC (US)

(73) Assignee: Next Safety, Inc., Jefferson, NC (US)

( * ) Notice: Subject to any disclaimer, the term of this patent is extended or adjusted under 35 U.S.C. 154(b) by 0 days.

(21) Appl. No.: 11/553,246

(22) Filed: Oct. 26, 2006

(65) Prior Publication Data

US 2007/0097295 A1 May 3, 2007

Related U.S. Application Data

(63) Continuation of application No. 11/365,471, filed on Mar. 1, 2006, now abandoned, which is a continuation of application No. 10/529,832, filed as application No. PCT/US03/30651 on Sep. 29, 2003, now abandoned.

(60) Provisional application No. 60/414,874, filed on Sep. 30, 2002, provisional application No. 60/414,868, filed on Sep. 30, 2002, provisional application No. 60/448,032, filed on Feb. 18, 2003, provisional application No. 60/448,033, filed on Feb. 18, 2003.

(51) Int. Cl.
*C03C 12/02* (2006.01)

(52) U.S. Cl. ............... 428/143; 428/329; 428/328; 428/323

(58) Field of Classification Search ............... 428/156, 428/323, 328, 329, 204, 161, 162, 164, 167; 359/129
See application file for complete search history.

(56) References Cited

U.S. PATENT DOCUMENTS

| 3,679,451 | A | * | 7/1972 | Marks et al. | 220/2.1 R |
| 4,769,265 | A | * | 9/1988 | Coburn, Jr. | 428/40.4 |
| 5,840,405 | A | * | 11/1998 | Shusta et al. | 428/156 |
| 6,249,271 | B1 | * | 6/2001 | Albert et al. | 345/107 |
| 6,265,061 | B1 | * | 7/2001 | Kang et al. | 428/323 |
| 2007/0110960 | A1 | * | 5/2007 | Frey et al. | 428/143 |

OTHER PUBLICATIONS

International Search Report for PCT/US03/30651.

* cited by examiner

*Primary Examiner*—Anabel M Ton
(74) *Attorney, Agent, or Firm*—Thomas, Kayden, Horstemeyer & Risley, LLP

(57) ABSTRACT

Roadway and vehicular-mounted safety reflectors include a reflective field that incorporates a plurality of discrete crystals that internally reflect light and return the light in a desired directional pattern determined by the internal reflection characteristics and orientation of the crystals. The directional pattern is chosen to optimize the visibility and functionality of the reflector.

25 Claims, 8 Drawing Sheets

US 7,438,968 B2

ROADWAY AND VEHICULAR-MOUNTED REFLECTORS INCORPORATING A FIELD OF DISCRETE CRYSTAL REFLECTORS AND RETROREFLECTORS

CROSS-REFERENCE TO RELATED APPLICATIONS

This application is a continuation of application Ser. No. 11/365,471, filed Mar. 1, 2006 now abandoned, which is a continuation of application Ser. No. 10/529,832, filed Mar. 30, 2005, which is a 371 of PCT/US03/030651, filed Sep. 29, 2003.

This application claims the benefit of U.S. Provisional Application Nos. 60/414,874, filed Sep. 30, 2002; 60/414,868, filed Sep. 30, 2002; 60/448,032, filed Feb. 18, 2003, and 60/448,033, filed Feb. 18, 2003, all of which are entirely incorporated herein by reference.

FIELD OF THE INVENTION

The invention relates to roadway and vehicular-mounted safety reflectors that enhance vehicular safety by being more easily visible.

DESCRIPTION OF THE PRIOR ART

For over seventy-five years roadway and vehicular-mounted reflectors have been used to enhance vehicular traffic safety. Typical reflectors in use for many years have utilized translucent molded plastic in various colors appropriate to the use. It would be desirable to provide improved reflectors that would be more easily visible to the eye in both daylight and nighttime conditions.

SUMMARY OF THE INVENTION

Roadway and vehicular-mounted safety reflectors include a reflective field that incorporates a plurality of discrete crystals that internally reflect light and return the light in a desired directional pattern determined by the internal reflection characteristics and orientation of the crystals. The directional pattern is chosen to optimize the visibility and functionality of the reflector. The crystals may be formed of any suitable crystal material that will adequately provide internal reflection of light. In one aspect of the invention, preferred crystal materials are metallic oxide crystals, most preferably single crystals of aluminum oxide ($Al_2O_3$) and zirconium oxide ($ZrO_2$). In another aspect of the invention, preferred crystal materials are carbide crystals, most preferably single crystals of silicon carbide (SiC) and boron carbide ($B_4C$).

In one embodiment of the invention, the crystals that collectively establish the reflective field are faceted or cut to a shape, for example a round gemstone-like cut that permits the crystals to internally reflect the incident light in a direction approximately normal to the face of the reflector. In another embodiment, the crystals are formed with a geometry, for example a corner cube retroreflector, that allows incident light to be reflected back through the face of the crystal in a direction parallel to the incident light.

The crystals may be doped so that they return incident light at a known wavelength spectrum, for example, light in the red spectrum or light in the blue spectrum. Crystals of different colors may be grouped together in zones within the reflective field.

The reflectors may include phosphors to create a stimulated emission of a desired wavelength distribution of light.

The invention may also be defined as a system for enhancing vehicular safety comprising a plurality of roadway reflectors, each roadway reflector comprising a plurality of crystals that internally reflect incident light and return the internally reflected light in a desired directional pattern determined by the internal reflection characteristics and orientation of the crystals. This system may also include vehicular-mounted reflectors.

BRIEF DESCRIPTION OF THE DRAWINGS

Some of the features of the invention having been stated, other features will appear as the description proceeds, when taken in connection with the accompanying drawings, in which.

DETAILED DESCRIPTION OF THE INVENTION

While the present invention will be described more fully hereinafter with reference to the accompanying drawings, in which aspects of the preferred manner of practicing the present invention are shown, it is to be understood that the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
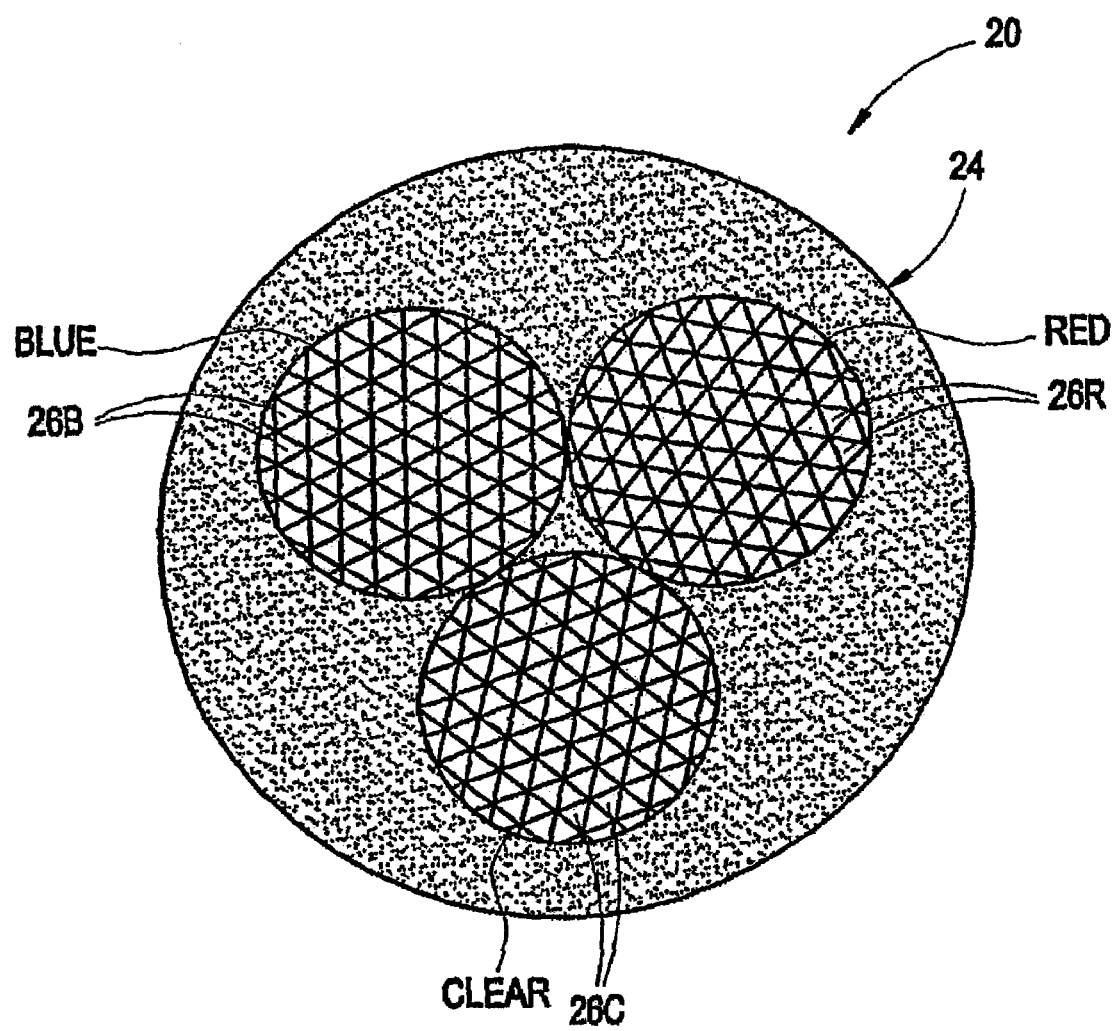
FIG. 1 is a front view of a roadway signpost reflector with a reflective field having three discrete circular zones including crystals that are red, blue and clear, respectively.

Referring to the drawings, and particularly to FIG. 1, there is shown a roadway signpost reflector 20 of the invention that includes a reflective field 24 comprising a plurality of crystals that are grouped together in three circular zones according to color, with red crystals 26R residing in zone R, blue crystals 26B residing in zone B and clear crystals 26C residing in zone C.

Figure 2:
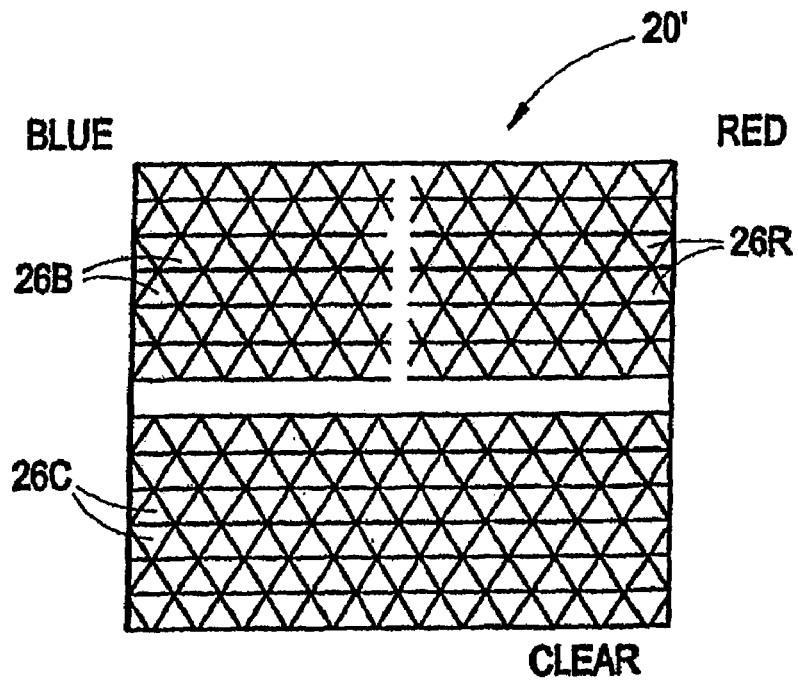
FIG. 2 is a front view of another signpost reflector, similar to the reflector of FIG. 1, having a rectangular shape with side-by-side upper zones of red and blue crystals, and a lower zone with clear crystals.

Another reflector 20' is shown in FIG. 2 wherein crystals 26R and 26B are grouped into two square zones that reside above a third rectangular zone containing crystals 26C.

Figure 3:
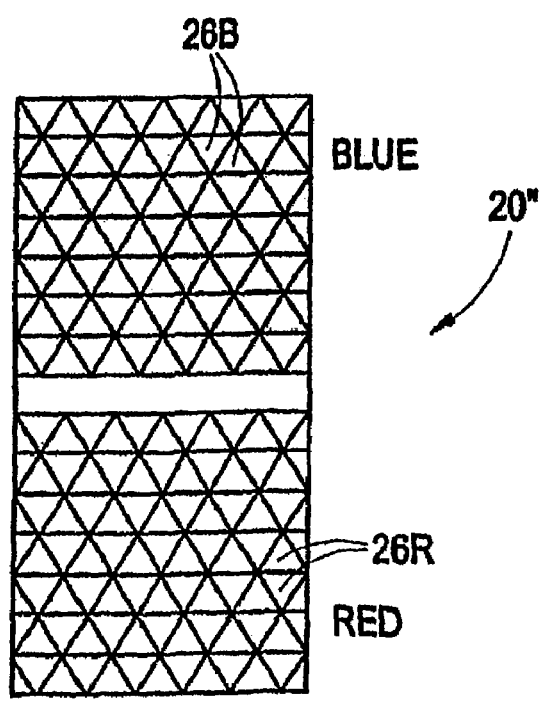
FIG. 3 is a front view of another signpost reflector, similar to the reflector of FIG. 2, having a rectangular shape with an upper zone of blue crystals, and a lower zone of red crystals.

Reflector 20" shown in FIG. 3 includes crystals 26B and 26R that are grouped into two square zones residing in a rectangular reflective field.

While reflectors 20, 20' and 20" are intended for use as roadway signpost reflectors, functionally similar reflectors may be mounted on vehicles.

Figure 4:
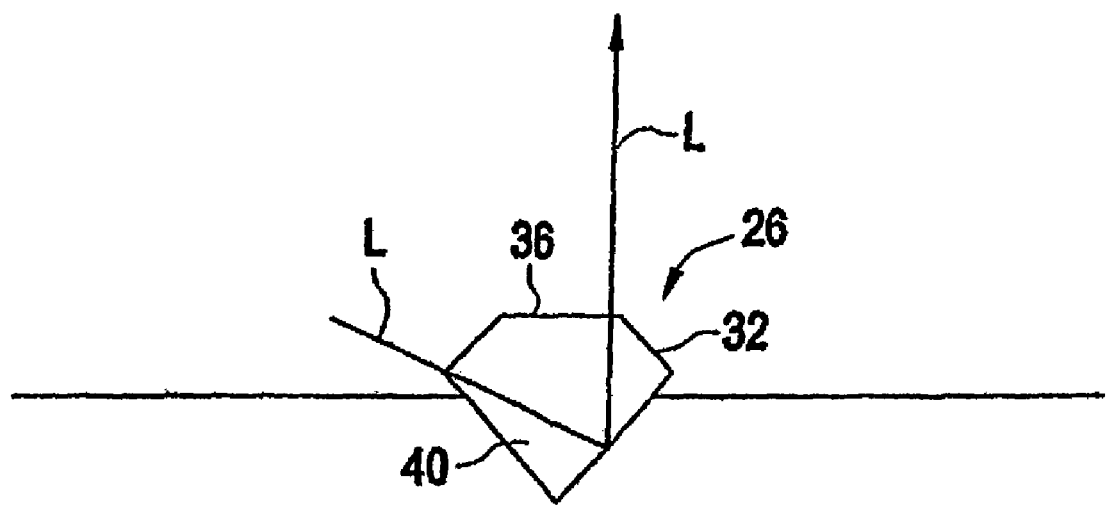
FIG. 4 is a greatly enlarged side view of one crystal as employed in the reflectors of FIGS. 1, 2 and 3 with adjacent crystals not shown to facilitate illustration, and also showing a ray of light that is incident on the bevel of the crystal, reflects internally within the crystal and emerges from the crown in a direction approximately normal to the front face of the reflector.
Figure 5:
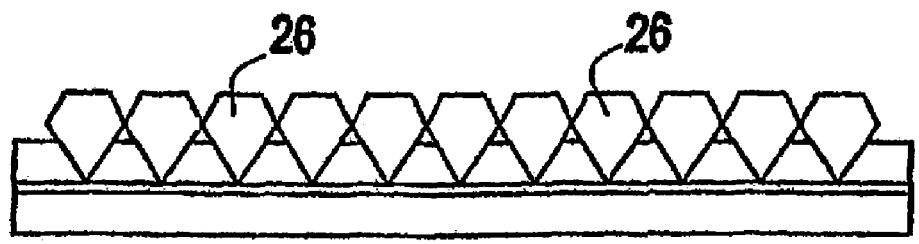
FIG. 5 is an enlarged view showing one row of crystals as they are permanently embedded and secured into the substrate of the reflector with the bevel and crown of the crystals exposed.

The crystals of reflectors 20, 20' and 20" of FIGS. 1, 2 and 3 are configured to internally reflect incident light and return the light from the reflective field in a desired directional pattern determined by the internal reflection characteristics and orientation of the crystals. The directional pattern is chosen to optimize the visibility and functionality of the reflector. In one embodiment, the crystals are configured to return light from the reflective field in a direction approximately normal to the face of the reflective field. In this embodiment, the crystals preferably are faceted or cut to collect and internally reflect incident light, for example, faceted in the manner of round cuts, such as in a round gemstone-like cut, as typified by the greatly enlarged side view of crystal 26 shown in FIG. 4. Crystal 26 includes a bevel 32, a crown 36 and a main body portion or pavilion 40 that is secured to or embedded in the material of the reflector body or substrate so that the bevel and crown are exposed to incident light. As shown in FIG. 4, a typical ray of light L incident on bevel 32 enters the crystal where it is internally reflected according to well-established optics principles, and emerges from crown 36. A side view of an entire row of crystals 26 is shown in FIG. 5.

Figure 6:
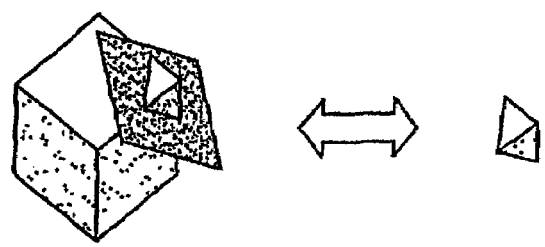
FIG. 6 is an illustrative aid showing how the shape of a corner cube relates to a removed corner portion of a cube.
Figure 9:
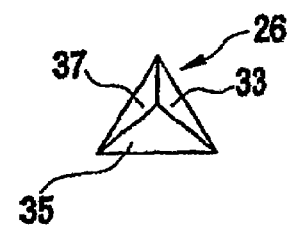
Figure 10:
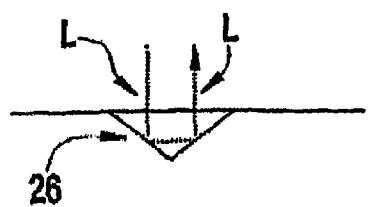
FIG. 10 is a greatly enlarged side view of one crystal retroreflector as may be employed in one embodiment of the reflectors of FIGS. 1, 2 and 3. The figure shows a ray of light that is incident on the crystal retroreflector, reflects internally within the crystal and emerges from the crystal in a direction parallel to its direction of incidence or, stated differently, at a reflection angle of 180°.

In another embodiment, the crystals that collectively establish the reflective field of a reflector 20, 20', 20" are formed with a geometry that allows incident light entering the face of the crystal to be reflected back through the face of the crystal in a direction parallel to the incident light; i.e., 180° reflection. Crystals that achieve this type of reflection will be referred to herein as "retroreflectors". One preferred form of retroreflector geometry is a corner cube, a trihedral structure whose geometry is illustrated by reference to the illustrative aid of FIG. 6 and the top, side and bottom views, respectively, of FIGS. 7, 8 and 9. As shown in FIG. 10, light entering a corner cube retroreflector 26 is internally reflected and emerges in a direction parallel to the incident light. The corner cube of FIGS. 7-10 includes a top face 31 and three rear faces 33, 35 and 37.

Other geometries for retroreflectors of the invention may be used, for example, spherical retroreflectors. Also, it will be noted that in the art structures other than the structure of FIGS. 7-10 are sometimes referred to as "corner cubes" or "corner cube reflectors". Crystal retroreflectors formed of these structures are also deemed to be encompassed within the scope of this invention.

In one preferred manner of carrying out the invention, the body of reflector 20 is formed of a high temperature thermoplastic that serves as a substrate to which crystals 26 are secured. One suitable thermoplastic material is Lexan® Grade 503 UV stabilized, glass-fiber-filled polycarbonate, manufactured by GE Plastics of Pittsfield, Mass., USA. The thermoplastic may be stamped and coated with a reflective material as described below. The Lexan® product, and other suitable thermoplastic materials for the reflector substrate, preferably have sufficient temperature resistance to regularly withstand 80° C. temperatures and a high enough elastic modulus to maintain stiffness at this temperature, and have a low coefficient of expansion and a sufficient flexural modulus.

Other suitable materials include Lexan® Grade 143 and other similar grades of Lexan®, as well as various grades (e.g., grades 1000 and 2300) of Ultem® polyetherimed (PEI), also manufactured by GE Plastics. The PEI material may be optionally reinforced, for example, glass reinforced.

In certain preferred embodiments of the invention, a reflective coating is added to the rear faces of the crystals, for example rear faces 33, 35, 37 of the retroreflector crystals shown in FIGS. 7-10. The reflective coating may take the form of a metallic surface deposited on the rear faces by a suitable process such as chemical vapor deposition. The reflective coating effectively serves to prevent light from escaping from the rear faces of the crystals.

As an option to, or in addition to, providing a reflective coating on the rear faces of the crystals, the substrate may incorporate reflective surfaces where they support the crystals.

Figure 13:
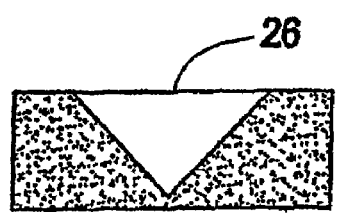
FIG. 13 is a sectional view of one crystal retroreflector embedded into the thermoplastic substrate material of a reflector.
Figure 14:
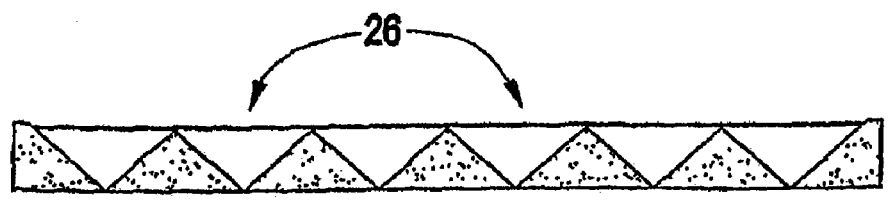
FIG. 14 is a sectional view, similar to FIG. 13, showing multiple, aligned retroreflectors embedded into the substrate.
Figure 15:
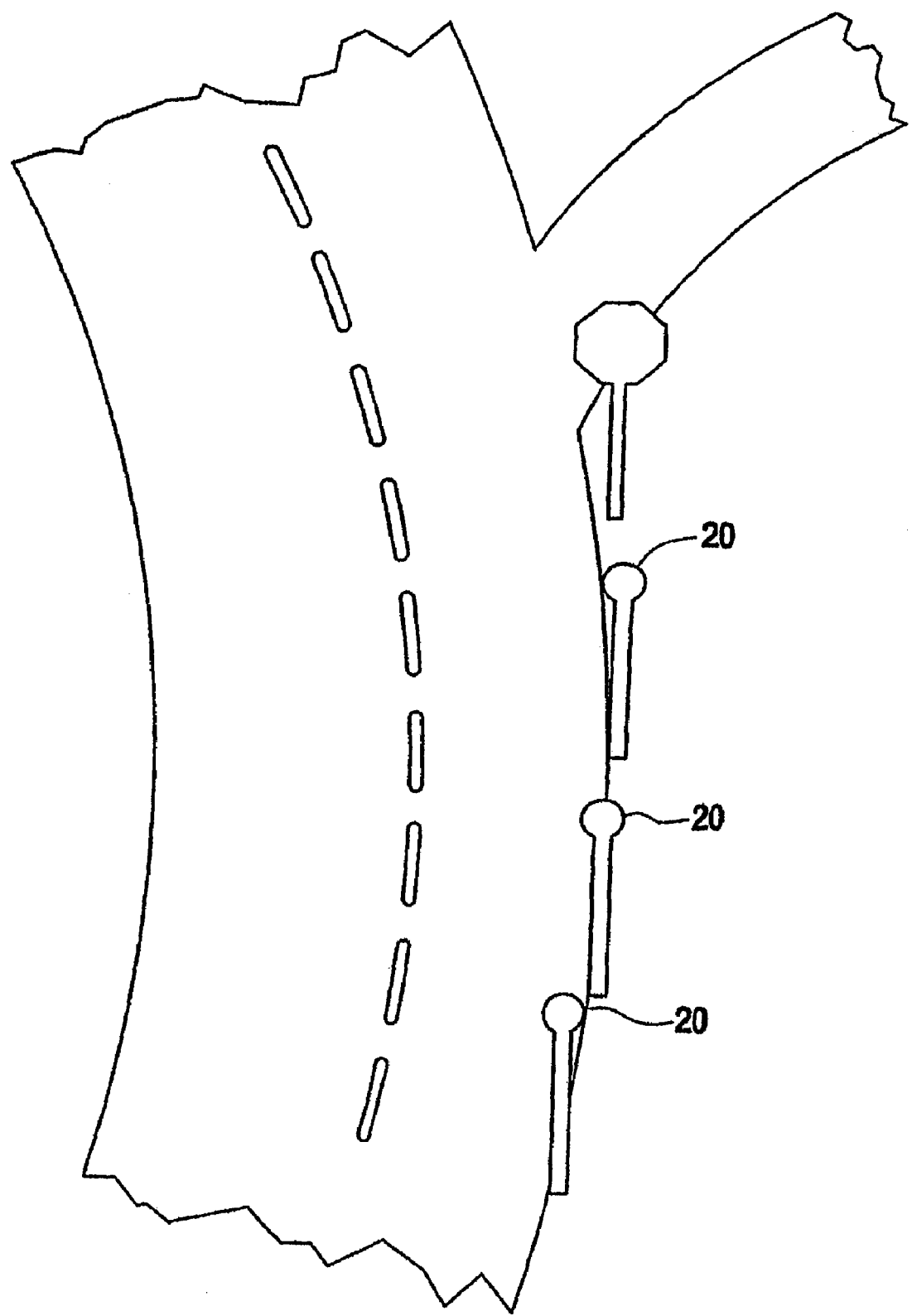
FIG. 15 is a view of a roadway showing three circular reflectors of FIG. 1 mounted on signposts.

The manufacturing of a reflector of the invention, such as reflectors 20, 20' and 20" of FIGS. 1, 2 and 3, may be carried out by first arranging an array of crystals 26 for a particular reflector in a template (not shown), with each crystal properly oriented. The template is then brought into registration with the substrate which has been heated to a softening temperature sufficient to permit the main body portions of the crystals to be pressed into the substrate and embedded therein, as shown in FIGS. 4 and 5 and in FIGS. 13 and 14. The plastic substrate is permitted to cool, leaving the crystals embedded within and adhered to the substrate. Optionally, a binder may be used to enhance the adhesion of the crystals to the substrate. In certain embodiments, the binder or a coating containing phosphors is utilized to create a stimulated emission of a required wavelength distribution of light. The phosphors may also be coated on, implanted in, or embedded in a lens in front of the crystals. Phosphors provide an additional advantage know as "persistence", meaning the emission may continue for a short interval of time after the initial stimulation. For a roadway signpost reflector such as shown in FIGS. 1, 2 and 3 that has a front face on the order of eight square inches, a substrate thickness for a material such as Lexan® 503 may be on the order of 0.30 inches. Vehicular-mounted reflectors may utilize a thinner substrate, or may carry the crystals in another manner suitable for vehicular mounting of the reflector.

Figure 11:
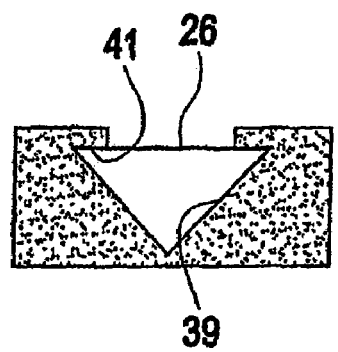
FIG. 11 is a sectional view of a portion of a reflector showing one crystal retroreflector after it has been press fitted into a holding cavity formed in the reflector substrate.
Figure 12:
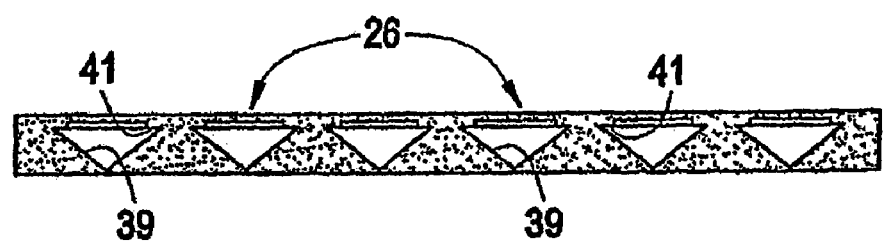
FIG. 12 is a sectional view, similar to FIG. 11, but showing multiple, aligned retroreflectors in their respective holding cavities.

As an alternative manufacturing technique, the crystals may be press fitted into mating cavities in the thermoplastic substrate. In this regard, with reference to FIG. 11, crystal retroreflectors of the invention can be attached to the thermoplastic substrate by using a cavity 39 with a small lip 41 that covers the marginal edge part of the retroreflector top face. The retroreflectors may be press fitted into cavities 41.

Figure 16:
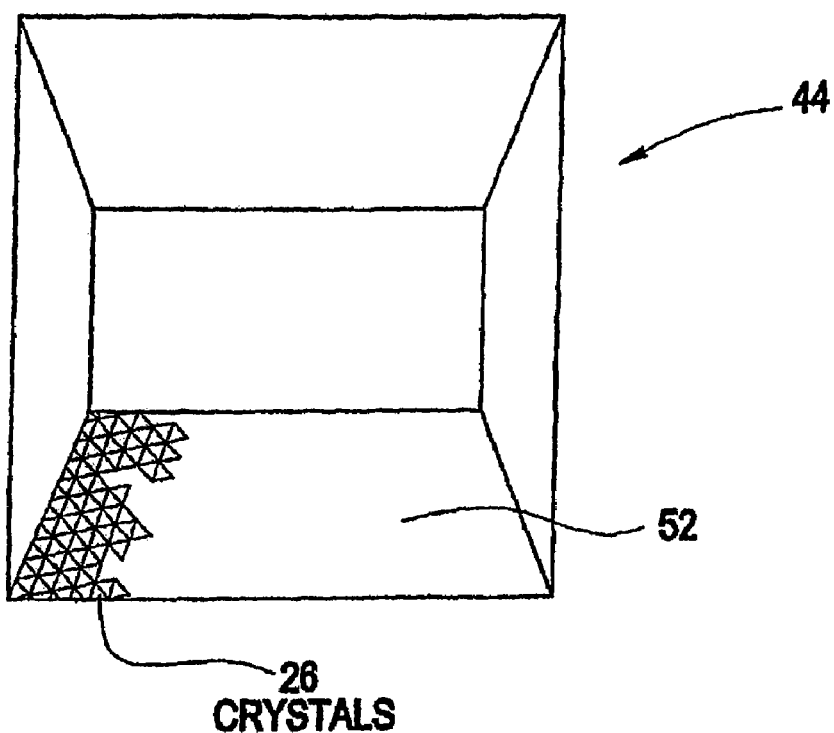
FIG. 16 is a top view of an embedded highway marker having a reflective field incorporating crystals.
Figure 17:
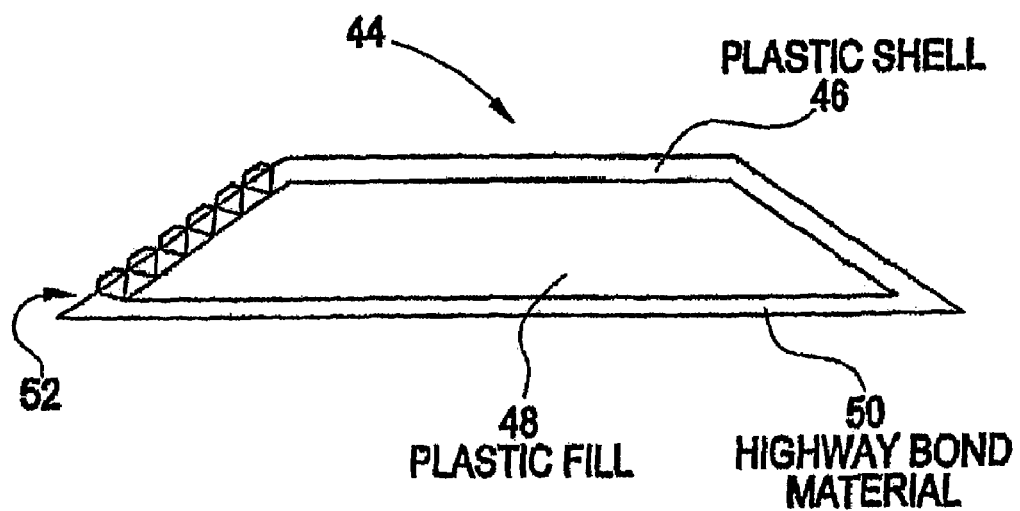
FIG. 17 is a side view of the embedded highway marker of FIG. 16.

Another reflector of the invention is shown in FIGS. 16 and 17 as incorporated into an embedded highway marker 44. Marker 44 includes a plastic shell 46, a plastic fill material 48 and a highway bond material 50 for adhering the marker to the highway surface, for example, at the highway center line or at a highway edge boundary line. Shell 46 may take the form of one of the plastics materials described above for use as the substrate for reflectors 20, 20', 20", preferably somewhat softer than the formulations used for those reflector substrates. Fill material 48 may take the form of one of the General Electric plastics materials set forth above, preferably with a lower elastic modulus and a lower setting temperature. The highway bond material may take the form of a mix of relatively large particles (1 to 3 mm) of silicon dioxide sand which is embedded onto the bottom of the marker while warm, or is glued utilizing glue that retains its bonding capability at temperatures up to 80° C. A traffic-facing surface 52 of marker 44 includes crystals 26 that are press fit, embedded or otherwise suitably secured at surface 52. Thus, embedded highway marker 44 has a reflective field at surface 52 that provides enhanced visibility through the light-returning characteristics of the crystals.

It will be appreciated that reflectors of the invention may also take the form of various paints, tapes, resins, or the like, that serve as a substrate or otherwise serve to hold crystals 26 in place to define a reflective field. In addition, the reflectors may be fabricated from white paint incorporating crystals. In certain embodiments, these crystals may internally reflect and return light of one specific range of wavelength distribution, such as blue.

The choice of the particular materials to be used for the crystals of the invention is based on a number of factors. Preferably, the materials will exhibit a relatively flat dispersion curve (wavelength vs. refractive index) for visible light that passes through the material. The material should be relatively inexpensive to produce in bulk. Where faceting or shaping of the crystals is desirable, the material should be susceptible to relatively simple and inexpensive faceting. The materials also should be capable of being reliably produced at a particular desired and uniform color, as by doping the crystals during production to produce desired wavelength distributions from internally reflected light. Other desired characteristics of the crystals include:

1. High Refractive Index. This permits internally reflected light to be efficiently reflected in a specific direction. Thus, more light is seen at greater distances by vehicular drivers.
2. High Hardness. The crystal surface maintains its integrity without wearing. High hardness is fundamental to reducing surface scattering effects that degrade or eliminate the ability of a reflector to efficiently reflect light long distances in specific directions.
3. Color Uniformity. The ability to control dopant distribution evenly throughout the crystal creating a desired wavelength distribution that is relatively uniform.

In one aspect of the invention, preferred crystal materials are metallic oxide crystals, most preferably single crystals of $Al_2O_3$ and $ZrO_2$. Both materials have high refractive indices and a hardness measured on the Mohs' scale in the range from 8.7 to 9, as well as the other characteristics identified above.

Aluminum oxide may be doped with chromium to produce a red color, preferably such as to return light that is internally reflected therein at a wavelength distribution curve that produces the optimum biological response of the human eye during the daytime. Aluminum oxide may be doped blue, preferably so that internally reflected light emerging from the crystal has a wavelength distribution curve that produces the optimum biological response of the human eye during the night. Furthermore, zirconium oxide in its cubic form may be doped red or blue, both colors similar in wavelength to those discussed immediately above.

As used herein, the term "oxide crystals" refers to useful forms of crystalline oxides that are capable of internally reflecting incident light in the manner described herein, most preferably, crystalline metallic oxides. As mentioned above, the preferred oxide crystals are single crystals of aluminum oxide ($Al_2O_3$) and single crystals of zirconium oxide ($ZrO_2$). zirconium oxide is preferably used in its cubic form, and in certain preferred embodiments, may be $Y_2O_3$-stabilized cubic zirconium oxide.

In another aspect of the invention, preferred crystal materials are carbide crystals, most preferably single crystals of silicon carbide (SiC) and boron carbide ($B_4C$). Both materials have high refractive indices and a hardness over 9 as measured on the Mohs' scale, as well as the other characteristics identified above. These crystals may be doped to produce color characteristics, preferably so that the crystals return light that is internally reflected therein at a desired wavelength distribution curve. Doping of silicon carbide to produce crystals of various colors is discussed in U.S. Pat. No. 5,723,391, incorporated herein by reference in its entirety.

As used herein, the term "carbide crystals" refers to useful forms of crystalline carbides that are capable of internally reflecting incident light in the manner described herein. As mentioned above, the preferred carbide crystals are single crystals of silicon carbide (SiC) and single crystals of boron carbide ($B_4C$). These single crystalline materials are commercially available and can be produced with the optical properties desirable for use with this invention.

It will be appreciated that the term "incident light", as used herein, is intended to refer to all light that is incident on a crystal/reflector, including naturally occurring ambient light, light from sources such as vehicular headlights, street lights, or the like, as well as light beams that emanate from vehicle-mounted light sources whose specific purpose is to cast beams of light on the crystals/reflectors.

Also, it will be appreciated that the term "reflector" has been used herein to refer to the structure of the invention whereby incident light on the reflector is internally reflected within the crystals and returned or emitted, preferably at a known wavelength distribution. Thus, as used herein the term "reflector" encompasses more than simple reflection from a mirror or mirror-like surface.

Additionally, it will be appreciated that the crystals that are doped to produce desired color are generally lightly doped, as that term is understood in the industry, so that the crystals pass sufficient light therethrough to achieve the stated goal of internal reflection of the light within the crystals and emission of this internally reflected light from the crystal. In this regard, the doped crystals preferably are highly translucent to near transparent.

While reflectors 20, 20', 20", 52 shown in the drawings have flat or relatively flat substrates, resulting in the embedded crystals residing in substantially the same plane, it will be appreciated that the outwardly facing surface of the reflector may be curved to create a more angularly dispersed pattern of reflected light. Alternatively, this result may be achieved with a flat substrate by embedding the crystals at varying angles with respect to the substrate, for example, with some of the crystals being off axis to make the reflectors easily visible from the sides, resulting in a reflector that is less sensitive attitudinally.

It will also be appreciated that the crystals on any particular reflector may be provided in different sizes and/or different geometries to optimize the reflected light pattern for that reflector. The ability to fabricate crystals of the invention in small sizes offers advantages over other reflector structures that are limited to larger sizes. Also, the crystals of the invention are generally easy to mount to curved surfaces.

EXAMPLE I

Figure 7:
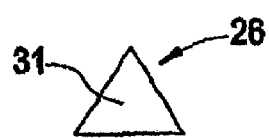
FIGS. 7, 8 and 9 are top, side and bottom views, respectively, of a corner cube retroreflector of the invention.
Figure 8:
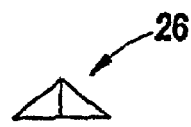

A roadway signpost reflector similar to reflector 20" of FIG. 3 is produced utilizing a Lexan® 503 substrate with oxide crystal retroreflectors attached thereto by press fit or embedding according to the techniques described above. The reflective field of the reflector includes two zones. The first zone contains red crystals of doped aluminum oxide. The second zone includes blue crystals formed of doped cubic zirconium oxide. The crystals are formed with a geometry substantially as shown in FIGS. 7-9, above, and preferably have a maximum dimension across the top face 31 from about 3 mm to about 30 mm. The crystals are oriented so that internally reflected incident light is reflected back in a direction parallel to the incident light.

EXAMPLE II

A roadway signpost reflector is produced that is identical to the reflector of Example I except that the red and blue zones incorporate crystals of silicon carbide that are doped red and blue, respectively.

EXAMPLE III

The center lines and side boundary lines of a roadway are formed of reflectors of the present invention. A white paint incorporates relatively small crystal retroreflectors. The paint/crystals is sprayed onto the roadway in a conventional striped manner. The paint may have a relatively low viscosity and other resin characteristics so that the paint runs off the inclined facets leaving a portion of the crystal exposed. In other embodiments, only a thin paint coating on the crystals is left after drying (curing). Thereafter, this thin coating is chemically removed, for example by etching, leaving a portion of the crystal substantially free of paint, while leaving the remainder of the crystal embedded in paint. (The crystals may be mechanically and/or chemically bonded to the paint.) While any suitable oxide or carbide crystal may be used for the retroreflectors, aluminum oxide crystals and boron carbide crystals are preferred for this use because of their high hardness. The crystals may have an average dimension across their top faces 31 ranging from about 0.3 mm to 13 mm. The paints described in this Example III may also be utilized for commercial or government roadway signage, or on vehicles.

Figure 18:
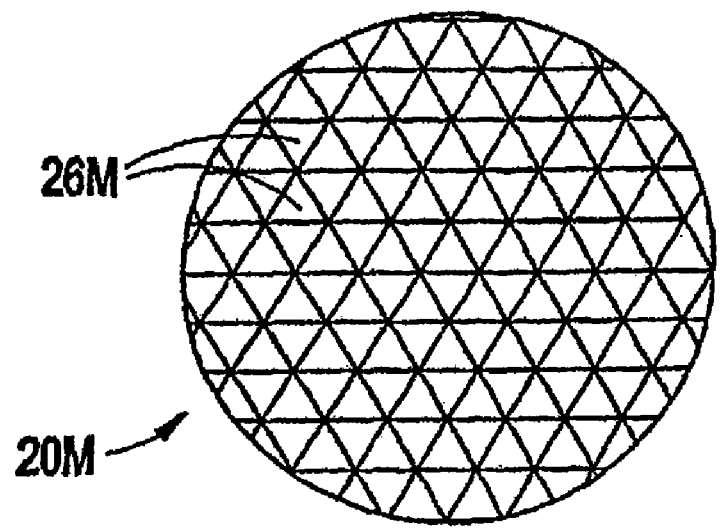
FIG. 18 is a top view of a monolithic reflector formed of oxide or carbide crystal, with multiple retroreflectors formed thereon.
Figure 19:
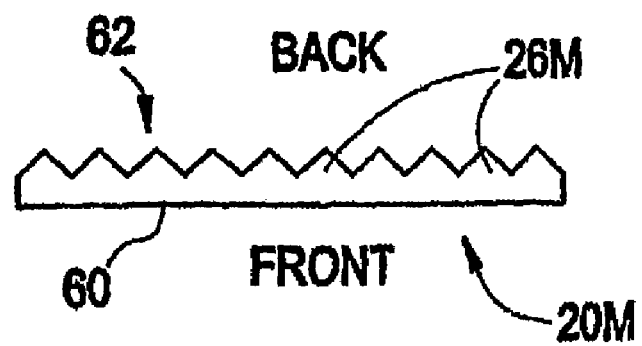
FIG. 19 is a side sectional view of one row of crystal retroreflectors formed in the monolithic reflector of FIG. 18.

Referring to FIGS. 18 and 19, the reflectors and associated crystal retroreflectors of the present invention may take a monolithic form. According to this embodiment, an entire reflector, including a desired number of discrete retroreflectors, may be fabricated from a single crystal, preferably an oxide crystal or carbide crystal as discussed above. FIG. 18 is a top view of a representative monolithic reflector 20M that incorporates multiple retroreflectors 26M. In a preferred manner of fabricating monolithic reflector 20M, the crystal is cut or otherwise formed to a circular, disc-like shape or other desired reflector shape, preferably with a flat front surface 60. The back surface 62 is thereafter formed with angular facets establishing multiple corner cube retroreflectors. The fabrication of the angular cuts may be formed by any suitable method effective for mechanically, chemically or otherwise removing the oxide crystal material. The fabrication technique may include:

1. mechanical hand faceting;
2. mechanical robotic faceting;
3. etching techniques using lithography (similar to semiconductor lithography;
4. laser machining (for example, high energy UV laser);
5. electronic discharge machining (EDM);
6. high pressure water machining;
7. high pressure water with abrasive machining.

The back surface 62 preferably is coated with a reflective coating.

While the present invention has been described in connection with certain illustrated embodiments and terminology, it will be appreciated that modifications may be made without departing from the true spirit and scope of the invention.

What is claimed is:

1. A reflector including a reflective field comprising a plurality of crystals that internally reflect incident light and return the internally reflected light in a desired directional pattern determined by the internal reflection characteristics and orientation of the crystals, wherein at least a portion of the crystals are metallic oxide crystals, and wherein at least a portion of the crystals return the incident light in a direction approximately normal to the face of the reflective field.

2. The reflector of claim 1, wherein at least a portion of the crystals are formed from a material selected from the group consisting of single crystalline aluminum oxide ($Al_2O_3$) and single crystalline zirconium oxide ($ZrO_2$).

3. A reflector including a reflective field comprising a plurality of crystals that internally reflect incident light and return the internally reflected light in a desired directional pattern determined by the internal reflection characteristics and orientation of the crystals, wherein at least a portion of the crystals are carbide crystals.

4. The reflector of claim 3, wherein at least a portion of the crystals are formed from a material selected from the group consisting of single crystalline silicon carbide (SiC) and single crystalline boron carbide ($BC_4$).

5. The reflector of claim 1, wherein at least a portion of the crystals are faceted with a bevel that is exposed to incident light.

6. The reflector of claim 1, wherein at least a portion of the crystals are faceted with a crown, a bevel and a main body portion, and the crown and bevel are exposed to incident light.

7. The reflector of claim 1, wherein at least a portion of the crystals return the incident light in a direction parallel to the incident light.

8. The reflector of claim 7, wherein at least a portion of the crystals are retroreflectors.

9. The reflector of claim 1, wherein the reflector is monolithic.

10. The reflector of claim 9, wherein the material forming the reflector is selected from the group consisting of a single oxide crystal and a single carbide crystal.

11. The reflector of claim 1, wherein at least a portion of the crystals are doped to return incident light at a known wavelength spectrum.

12. The reflector of claim 1, wherein at least a portion of the crystals are doped to return incident light in the red spectrum.

13. The reflector of claim 1, wherein at least a portion of the crystals are doped to return incident light in the blue spectrum.

14. The reflector of claim 1, wherein the reflective field comprises a plurality of crystals that return incident light at different, known wavelengths.

15. The reflector of claim 14, wherein crystal retroreflectors that return light at each of the different known wavelengths are grouped together in zones within the reflective field.

16. The reflector of claim 1, including a substrate formed of a thermoplastic material having the crystals secured thereto to form the reflective field.

17. The reflector of claim 1, including a lens to block light at wavelengths above or below a specified wavelength.

18. The reflector of claim 1, including phosphors to create a stimulated emission of a desired wavelength distribution of light.

19. The reflector of claim 18, wherein the phosphors are coated on at least a portion of the crystals.

20. The reflector of claim 1, mounted at roadside.

21. The reflector of claim 1, mounted on a motor vehicle.

22. The reflector of claim 1, located on a traffic-facing surface of an embedded highway marker.

23. The reflector of claim 1, wherein the reflective field comprises a material selected from the group consisting of paints, tapes and resins.

24. A system for enhancing vehicular safety comprising a plurality of roadway reflectors, each roadway reflector comprising a plurality of crystals that internally reflect incident light and return the internally reflected light in a desired directional pattern determined by the internal reflection characteristics and orientation of the crystals, wherein at least a portion of the crystals are metallic oxide crystals.

25. The system of claim 24, further comprising vehicular-mounted reflectors, each vehicular-mounted reflector comprising a plurality of crystals that internally reflect incident light and return the internally reflected light in a desired directional pattern determined by the internal reflection characteristics and orientations of the crystals.

* * * * *